July 11, 1967
E. A. COLECHIA ET AL
3,330,462
FASTENER DRIVING APPARATUS
Filed May 9, 1966
5 Sheets-Sheet 1
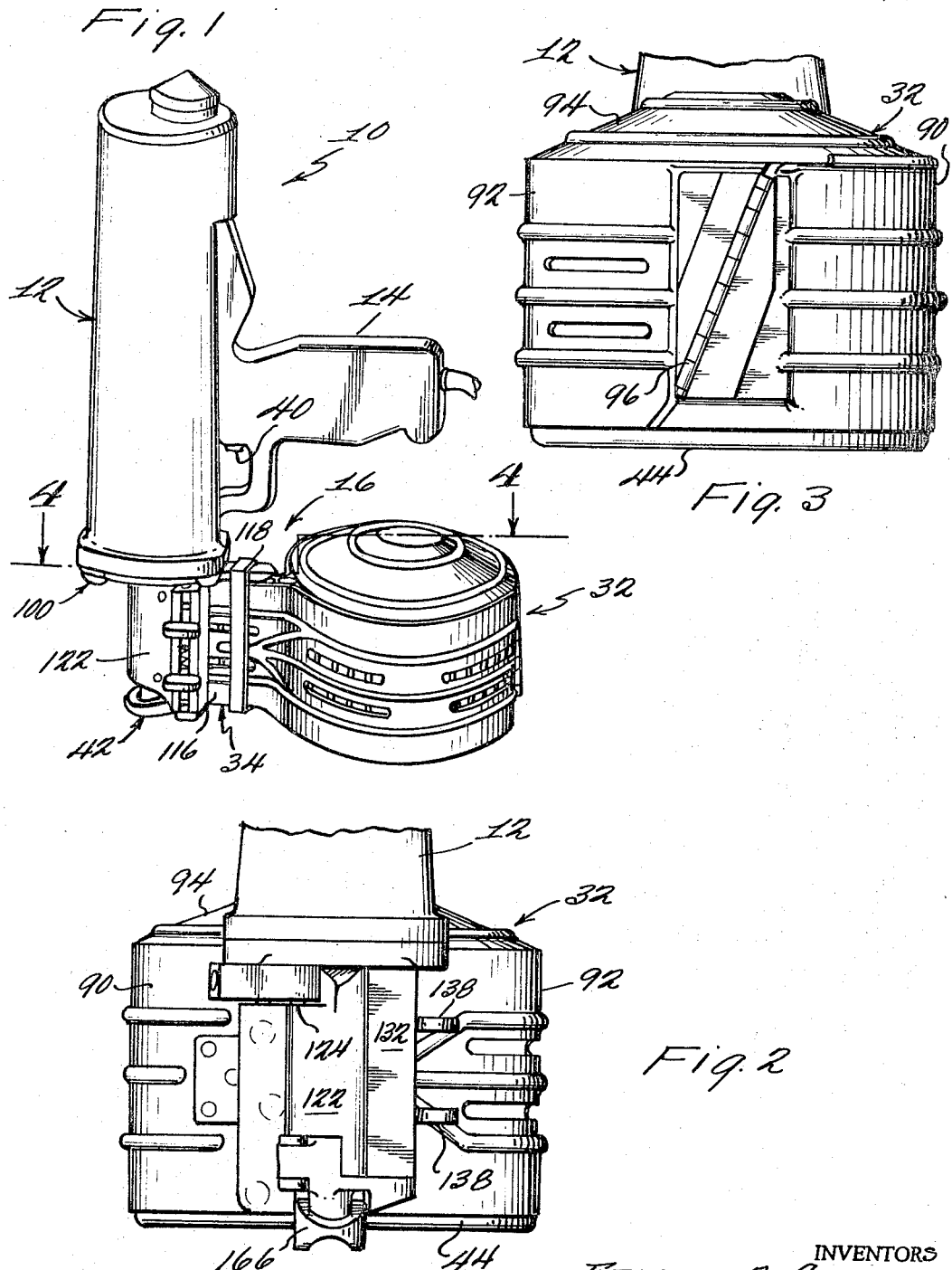

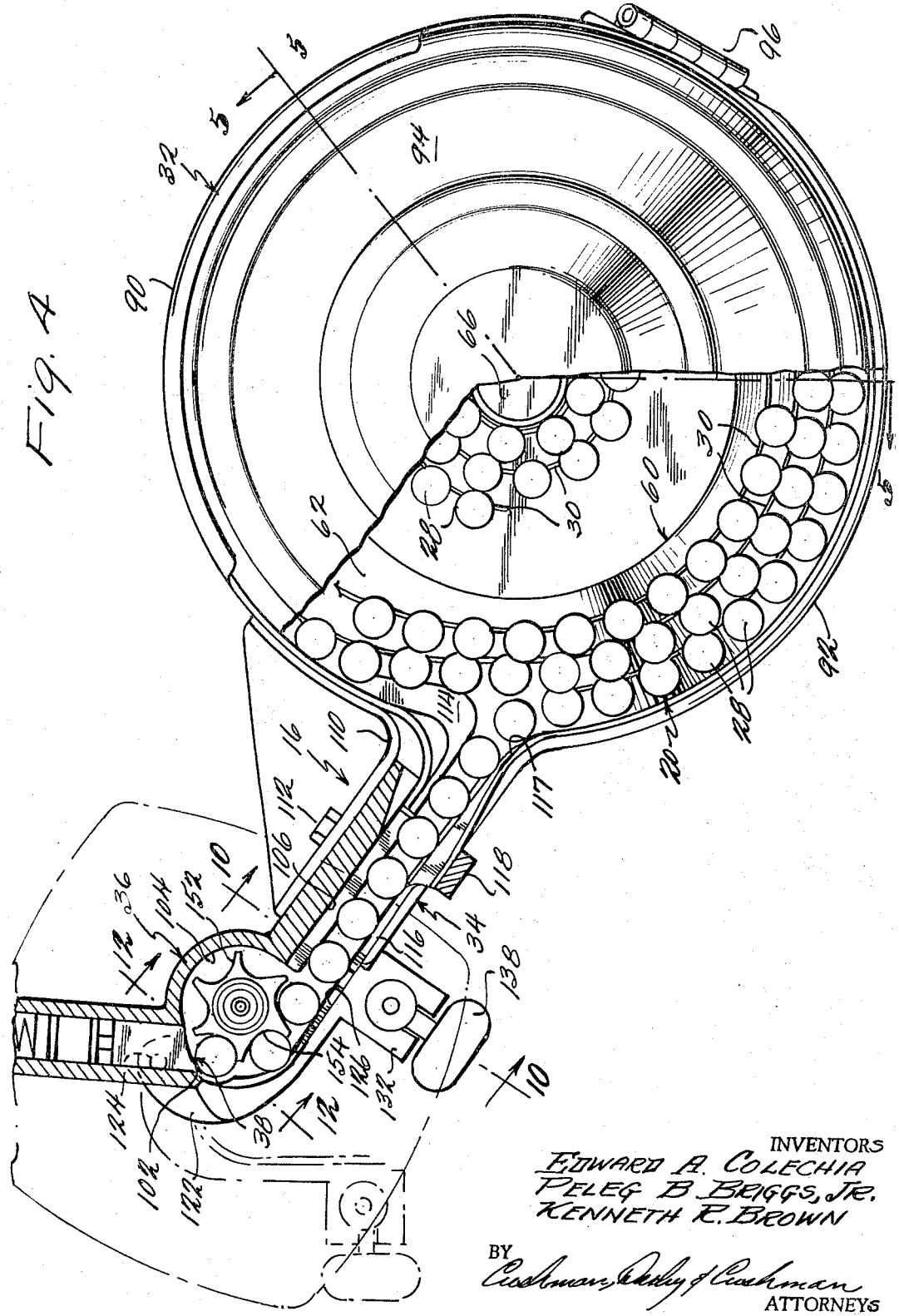

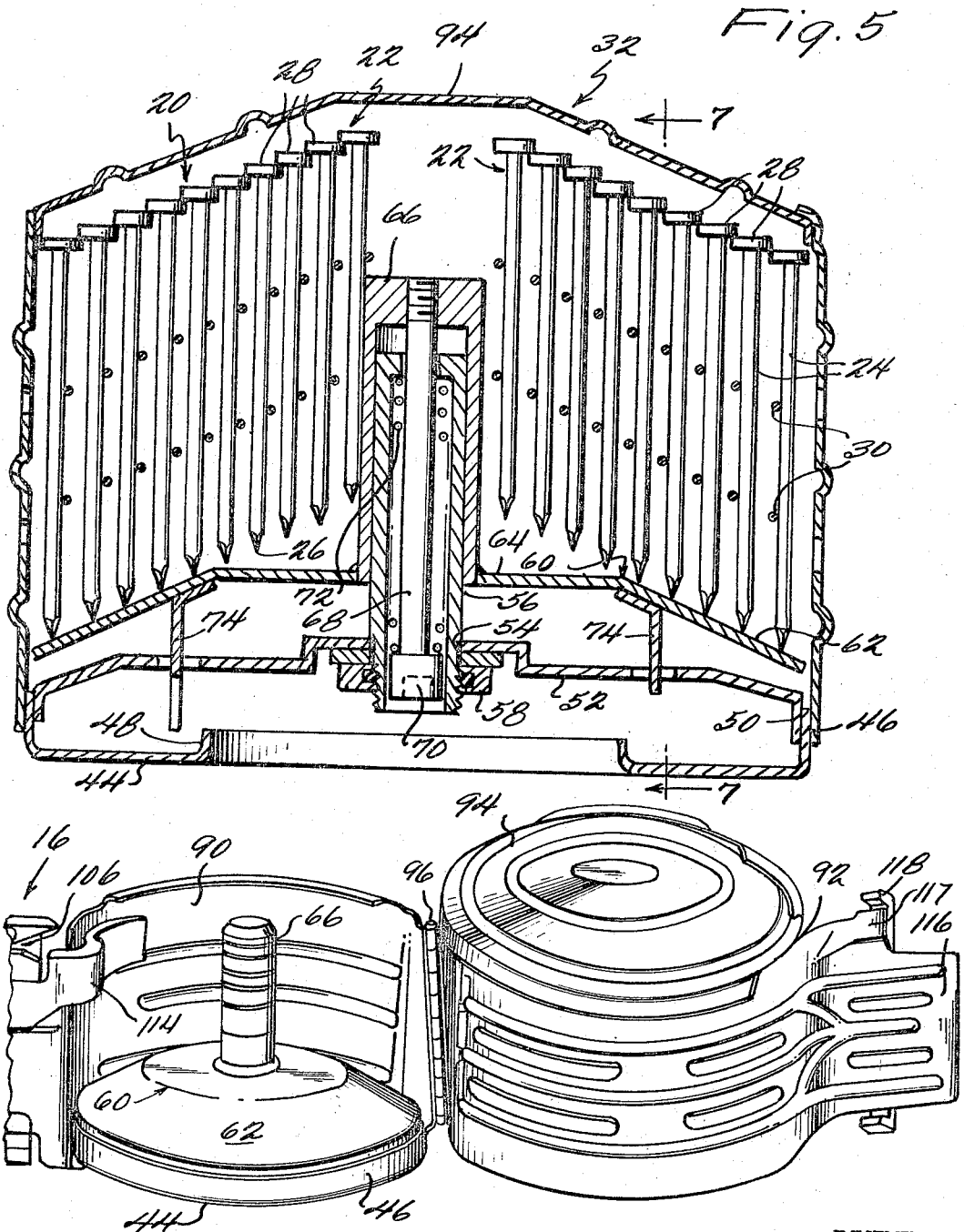

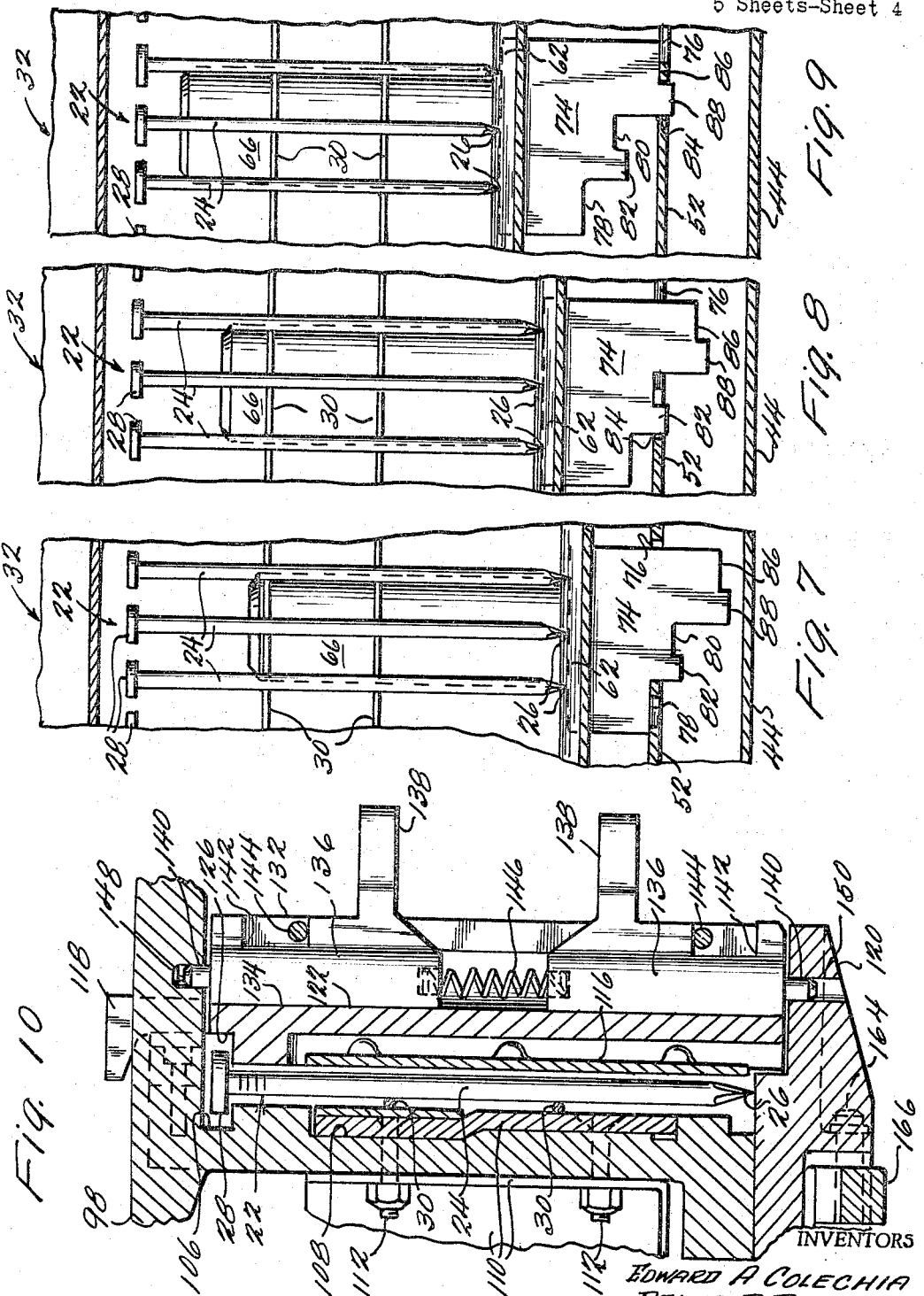

July 11, 1967 E. A. COLECHIA ET AL 3,330,462
FASTENER DRIVING APPARATUS
Filed May 9, 1966 5 Sheets-Sheet 5
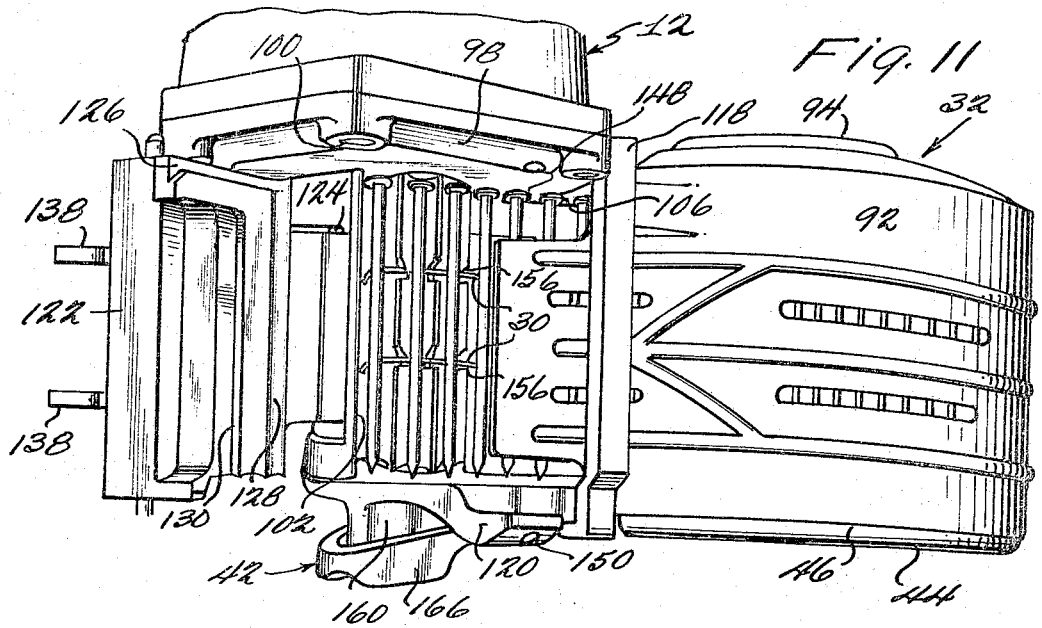
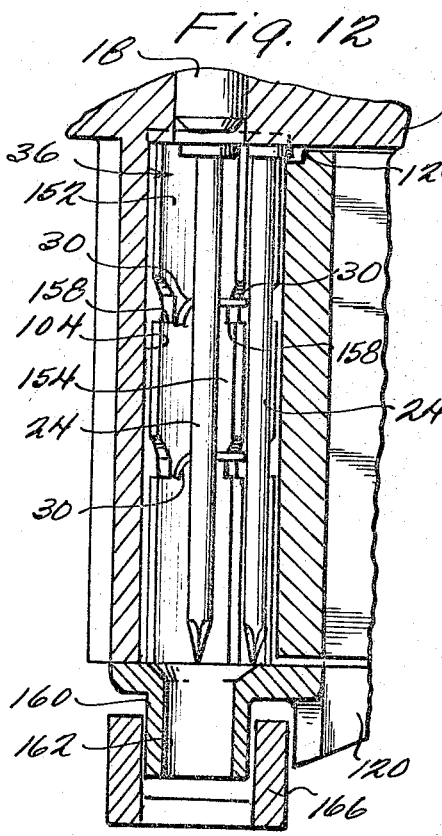
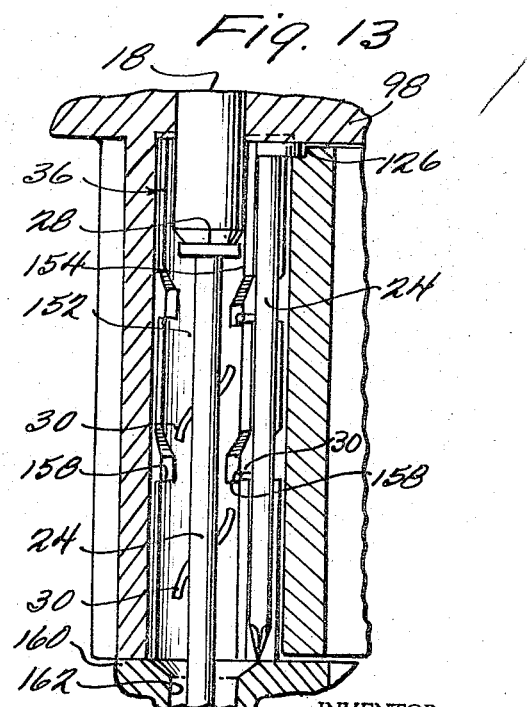
INVENTORS
EDWARD A. COLECHIA
PELEG B. BRIGGS, JR.
KENNETH R. BROWN
BY Cushman, Darby & Cushman
ATTORNEYS

United States Patent Office 3,330,462
Patented July 11, 1967

3,330,462
FASTENER DRIVING APPARATUS
Edward A. Colechia, East Greenwich, R.I., Peleg B. Briggs, Jr., Mystic, Conn., and Kenneth R. Brown, East Greenwich, R.I., assignors to Bostitch, Incorporated, East Greenwich, R.I., a corporation of Rhode Island
Filed May 9, 1966, Ser. No. 548,606
11 Claims. (Cl. 227—136)

This application constitutes a continuation-in-part of our application Ser. No. 396,841 filed Sept. 16, 1964, for fastener driving apparatus and now abandoned.

This invention relates to fastener driving apparatus and more particularly to improvements in the structure for handling fasteners in such apparatus.

Power actuated fastener driving apparatus have many advantages both from a labor saving standpoint and a time saving standpoint in connection with the driving of heavy duty fasteners, such as nails, for use in the construction industry. However, several problems arise in connection with endeavors to apply power actuated fastener driving concepts to such heavy duty fasteners. A tool for this application, while being portable, must also be relatively massive to withstand the forces developed to drive a nail in a single stroke. The weight of the nails used is also a significant factor and the added weight of a full magazine tends to reduce the maneuverability of the tool. Some saving in weight can be afforded by limiting the size of the nail package that the magazine will accept, but such limitation means more frequent reloading and, hence, increased amounts of nonproductive time.

Another problem in the construction of such driving tools is the necessity to provide for accurate and efficient retention of the fasteners within the magazine, guidance of the fasteners out of the magazine, and feed of the fasteners from the magazine to the driving chamber or delivery passage so that they will be properly driven by the single forceful stroke of the driver. In this regard, the specific manner in which the fasteners are packaged has an important bearing upon this structure. The present invention embodies a magazine structure in conjunction with a fastener package of the type disclosed in commonly assigned Peterson Patent 3,083,369, dated Apr. 2, 1963, for a nail assembly.

Previous efforts to provide a fastener driving apparatus for heavy duty fasteners have not proven entirely satisfactory. For example, there are presently available apparatus adapted to drive T-head nails. By forming the head of such nails in a rectangular configuration having a width equal to the diameter of the shank, it is possible to package such nails in a stick formation similar to staples. In such stick formation, the nails can be fed in much the same manner as a conventional staple stick is fed. However, such an arrangement presents two disadvantages when dealing with nails of relatively large size as, for example, six-penny and the above. First, the configuration of the head is such that it simply does not provide the same holding power as a common round-head nail. This can be a serious drawback, as, for example, in the building industry where code requirements must be met. Second, a stick of such nails containing a number adequate to afford a desirable infrequency in reloading may present some undesirable weight distribution problems. For example, when a stick of T-head nails are first loaded in an elongated magazine of a size to receive them, the center of gravity of the fastener load will be approximately at the middle of the T-head nail stick. As the stick is advanced, the center of gravity will move inwardly toward the feed, thus effecting a substantial change in the feel of the tool and its ease of maneuverability.

The first disadvantage of T-head nails can be readily overcome by using common round-head nails. However, such nails have not been satisfactorily packaged in stick formation. Various proposals have been made to package common nails in parallel relation, such as plastic tapes and paper belts. All of these proposals present the disadvantage that provision must be made in the fastener driving apparatus to handle the structure which packages the fasteners. For example, where plastic tape is used means must be provided to either drive the head of the nails through the tape or to sever the tape for driving with the nail in which case the portion of the plastic tape may well protrude above the head of the nail when driven. Fastener driving apparatus have provided for the stripping of the nails from the packaging means prior to the actual driving operation, but this presents the disadvantage that holding means must be provided for retaining the freed nail in the driving chamber prior to the driving operation, and the stripped packaging means must be separately handled.

The nail package, as described in the aforesaid Peterson patent, provides a packaging arrangement which presents an optimum condition in the construction of the fastener driving apparatus. As disclosed in the Peterson patent, the nails are interconnected in series in parallel relation by a pair of parallel flexible and frangible wires welded to the shank of each nail. With this arrangement, the portion of the wires which extend between each pair of adjacent parallel nails acts in effect like a parallel linkage permitting parallel movement both transversely and longitudinally between each pair of adjacent nails. With such capability, it is possible to form a multiplicity of nails into a coil in which the heads in each successive coil layer are disposed below the heads in the preceding coil layer. The resultant package consists of a coil of parallel fasteners which is generally cylindrical in peripheral configuration and conical or frusto conical in top and bottom configuration. This arrangement provides an optimum density of nails in a given space and further provides the advantage of a relatively stationary center of gravity as the coil is unwound during operation.

An object of the present invention is to provide a magazine structure for efficiently and effectively retaining a conical cylindrical package of nails of the type described in a manner which firmly retains the same in a condition permitting easy withdrawal of the outer layer of the coil from the magazine.

Another object of the present invention is the provision of a magazine structure and a conical cylindrical fastener package mounted therein in such a manner as to retain its formation under heavy percussive loads while permitting ready withdrawal of the fasteners of the package.

Another object of the present invention is the provision of a magazine structure of the type described having improved means for adjusting the same to accommodate fastener packages of various sizes.

While the conically coiled fastener package and magazine construction of the present invention provides the advantages of full round-head fastener construction and optimum nail density and weight distribution as compared with stick packages, there is presented a considerably more difficult problem of feeding the fasteners from a coiled package than from a stick package. The feeding of a stick package is a simple matter requiring merely the provision of a spring force at the remote end of the package which serves to resiliently bias the entire package toward a feeding position. This simple feeding arrangement is not possible with a coiled fastener package. On the contrary, the fasteners must be pulled from the coil, necessitating a much more complicated arrangement which is susceptible to malfunction in high speed operation.

In conjunction with the problem of feeding fasteners from coiled packages, a further problem is encountered in the support of the fasteners within the fastener delivery passage prior to the driving operation. As mentioned above, the arrangements heretofore provided have presented two difficulties. First, the handling of the packaging means at time of delivery; and/or, second, where the packaging means is prestripped, the handling of the individual fastener within the delivery passage.

In accordance with the principles of the present invention, a nail package constructed in accordance with the teachings of the Peterson patent presents an optimum condition with respect to both of these problems. First, the parallel wires which serve to package the fasteners permit the leading fastener of the package to be suspended by the wires directly within the delivery passage so that there is no need to provide for extraneous gripping means. Second, the driving movement of the leading fastener with the delivery passage may be utilized to sever the wires between the leading fastener and the next adjacent fastener so that when the leading fastener is driven into the work it will carry with it a portion of the wires. These wires serve as barbs within the work and increase the holding efficiency of the nail. Thus, there is no need to provide in the fastener driving apparatus a means for stripping the packaging means from the fasteners or for otherwise handling the packaging means separate from the fasteners. Instead, as is noted above, the packaging means in the form of parallel wires not only facilitates the support of the fasteners prior to driving but increases the efficiency of the fasteners once driven.

Accordingly, it is a further object of the present invention to provide a fastener driving apparatus of the type described having improved means for feeding the fasteners of a coiled package of the type described to the delivery passage of the apparatus.

Another object of the present invention is the provision of a feed means of the type described having an improved means for effecting the cutting action of the wire means which serve to package the fasteners in response to the driving movement of the leading fastener.

Another feature necessary to the efficient operation of a fastener driving apparatus of the type herein contemplated is the provision of a structure which enables the operator to gain quick access to the magazine for the purpose of reducing the time required to accomplish reloading and to gain access to the guide and feed means for the package to facilitate reloading as well as to facilitate repair in the event that jamming should occur.

Accordingly, it is a further object of the present invention to provide an apparatus of the type described having improved means for providing quick access not only to the interior of the magazine structure but to the interior of the guide structure between the magazine and the feed means and to the interior of the fastener delivery passage as well.

Another object of the present invention is the provision of an apparatus of the type described in which the component parts are arranged with respect to each other so that the device may be conveniently handled by an operator both horizontally and vertically for straight or toe-nailing, the arrangement presenting an optimum condition of balance which does not materially vary as the fastener load varies during use.

Another object of the present invention is the provision of an apparatus of the type described which is relatively simple in construction, efficient in operation and economical to manufacture and maintain.

These and other objects of the present invention will become more apparent during the course of the following detailed description and appended claims.

The invention may best be understood with reference to the accompanying drawings wherein an illustrated embodiment is shown.

In the drawings:

FIGURE 1 is a perspective view of a fastener driving apparatus embodying the principles of the present invention, illustrating the general arrangement of the component parts of the apparatus;

FIGURE 2 is a front elevational view of the lower fastener handling section of the apparatus shown in FIGURE 1;

FIGURE 3 is a rear elevational view of the structure shown in FIGURE 2;

FIGURE 4 is an enlarged fragmentary sectional view taken along the line 4—4 of FIGURE 1;

FIGURE 5 is a sectional view taken along the line 5—5 of FIGURE 4;

FIGURE 6 is a perspective view of the magazine construction of the present invention illustrating the same in its open access position for receiving a fastener package;

FIGURE 7 is an enlarged fragmentary sectional view taken along the line 7—7 of FIGURE 5;

FIGURE 8 is a view similar to FIGURE 7 showing the magazine structure adjusted to accommodate a fastener package of a size less than that illustrated in FIGURE 7;

FIGURE 9 is a view similar to FIGURE 8 showing the magazine structure adjusted to accommodate still a smaller size fastener package;

FIGURE 10 is an enlarged fragmentary sectional view taken along the line 10—10 of FIGURE 4;

FIGURE 11 is a perspective view of the structure shown in FIGURE 4 illustrating the feed means of the present invention and the manner in which access is provided to the feed means and the fastener delivery passage;

FIGURE 12 is a fragmentary sectional view taken along the line 12—12 of FIGURE 4, showing the manner in which a fastener is supported within the fastener delivery passage; and FIGURE 13 is a view similar to FIGURE 12 illustrating the manner in which the packaging wires are severed during the initial portion of the driving movement of the fastener within the fastener delivery passage.

Referring now more particularly to FIGURE 1 of the drawings, there is shown therein a fastener driving apparatus, generally indicated at 10, embodying the principles of the present invention. The apparatus 10 includes an elongated housing body section 12 having a handle 14 extending laterally outwardly from the central portion thereof and a fastener handling section, generally indicated at 16, fixedly secured to one end of the housing section 12 and extending outwardly therefrom in alignment with the handle 14 and in closely spaced relation thereto.

The body section 12 houses a pneumatically actuated fastener driving mechanism of any suitable construction, a preferred embodiment of which is disclosed in the commonly assigned copending application Ser. No. 352,494, entitled, "Fastener Driving Apparatus," filed Mar. 17, 1964, in the name of George A. Maynard and now Patent No. 3,259,292, issued July 5, 1966, the disclosure of which is hereby incorporated by reference into this specification.

The present invention is more particularly concerned with the fastener handling section 16 and its relation to the body section 12 and handle 14. The details of construction of the pneumatically actuated driving mechanism and the detailed mode of operating thereof form no part of the present invention. For present purposes, it is sufficient to note that this mechanism includes a fastener driver rod 18, see FIGURES 12 and 13, mounted within the body section 12 for reciprocating movement between a fastener receiving position disposed within the body section 12 and a fastener driven position extending outwardly therefrom. The fastener driver rod 18 serves to drive the leading fastener of a fastener package, generally indicated at 20, into a workpiece during its movement from its fastener receiving position to its fastener driven position.

As shown, the fastener package 20 is constructed in accordance with the disclosure of the aforesaid Peterson patent and includes a multiplicity of common nails 22, each having a shank 24 terminating at one end in a point 26 and at its other end in an enlarged circular head 28. The nails 22 of the package 20 are interconnected in series in parallel relation by a pair of parallel flexible frangible wires 30 welded to the shank 24 of each nail.

The fastener handling section 16 includes a magazine structure 32 for receiving and supporting the fastener package 20 in conical coil formation, a guide structure 34 for receiving and guiding the leading portion of the outer coil layer of the fastener package 20 supported within the magazine section 32, and a feed mechanism 36 for engaging the leading portion of the fastener package within the guide section 34 and effecting movement of the leading fastener thereof into a fastener delivery passage 38.

The pneumatically actuated driving mechanism is operable to effect movement of the driver rod 18 from its fastener receiving position when a leading fastener 22 has been moved into the fastener delivery passage 38, the operator has depressed a finger trigger 40 mounted adjacent the handle 14 and the apparatus has been moved into engagement with a work piece to depress an actuator shoe 42 movably carried by the fastener handling section 16. During the movement of the driver rod from its fastener receiving position to its fastener driven position, the nail 22 within the fastener delivery passage 38 is moved outwardly therefrom by the driver rod 18 into the work piece, the precise manner in which this movement is accomplished may be determined by referring to the aforesaid Maynard application. As disclosed therein, the pneumatically actuated driving mechanism is such as to recycle the driver rod 18 back into its fastener receiving position for repeated movement in this cycle when the above-mentioned starting conditions have been met.

Referring now more particularly to FIGURES 2–6, the magazine structure 32 comprises a work engaging base member 44 of generally disc-shaped configuration having an axially extending peripheral flange 46 formed at its outer periphery and its inner periphery bent inwardly to form an inner peripheral flange 48 parallel with the flange 46. Fixedly secured to the inner periphery of the outer flange 46 is the outer portion of a peripheral flange 50 of an inner base member 52. The inner base member has a central aperture 54 formed therein for receiving one end of a hollow spindle 56 secured to the central portion of the inner base member 52, by any suitable means, such as a nut assembly 58.

Carried by the fixed spindle 56 and inner base member 52 for movement into a plurality of adjusted positions with respect thereto, is a fastener package supporting assembly, generally indicated at 60. The assembly 60 includes an outer frusto-conical wall portion 62 disposed at an angle with respect to the axis of the spindle 56 generally equal to the conical angle of the fastener package 20. The inner periphery of the frusto-conical wall portion 62 is integral with the outer portion of a central flat circular wall portion 64 extending radially with respect to the axis of the spindle 56. The inner periphery of the inner wall portion 64 is fixed to one end of an outer spindle or cylindrical adjustment handle portion 66 rotatably mounted on the spindle 56.

Secured to the opposite end of the movable outer spindle 66 and extending therein through the fixed inner spindle 58 is a rod 68 having a nut member 70 engaged on the opposite end thereof. A compression spring 72 is disposed within the inner spindle 56 in surrounding relation to the rod 68 between the nut 70 and the opposite end of the spindle and serves to resiliently bias the supporting assembly 60 in a direction toward the base member 52.

Means is provided for maintaining the support assembly 60 in different spaced positions from the base member 52 for the purpose of accommodating fastener packages 20 of various sizes. As best shown in FIGURES 5 and 7, such means preferably comprises a plurality of circumferentially spaced adjusting tabs 74 fixedly secured to the support assembly 60 in a position to extend toward the base member 52.

As best shown in FIGURE 7, when the support assembly 60 is adjusted to accommodate a large size fastener package as, for example, a fastener package comprising eight-penny common nails 22, each of the adjusting tabs 74 extends within a registering opening 76 formed in the base member and an inner flat portion 78 of each adjusting lug engages and is supported by the adjacent surface of the inner base member 52. When it is desired to accommodate a fastener package of a smaller size, as for example, one containing six-penny nails, the operator grasps the movable outer spindle 66 and pulls the same while effecting a slight rotation so as to engage an intermediate portion 80 of each tab 74 with the adjacent surface of the base member 52. In order to prevent the supporting assembly 60 from moving out of the intermediate position shown in FIGURE 8, each tab includes a projection 82 adjacent its intermediate portion 80 which is adapted to enter an opening 84 formed in the base member 52 adjacent the associated opening 76.

It will be understood that additional positions of adjustment may be provided to accommodate fastener packages which are smaller than the package illustrated in FIGURE 8. One such position of adjustment is shown in FIGURE 9 in which an outer portion 86 is formed on each tab 74 with an associated projection 88 for engaging within the opening 84 when the portion 86 is disposed in engagement with the base member 52.

As best shown in FIGURE 6, the magazine structure 32 also includes a segmental fixed peripheral wall section 90 fixedly secured, as by welding or the like, along one marginal edge with the outer periphery of the outer flange 46 of the base member 44. The peripheral confinement of the fastener package 20 within the magazine section 32 is completed by means of a cooperating segmental peripheral wall section 92. The wall section 92 has rigidly thereto, as by welding and the like, a generally frusto-conically shaped closure wall 94.

As best shown in FIGURE 4, the peripheral wall sections 90 and 92 are of approximately 180° arcuate extent, the section 92 and cover section 94 fixed thereto being mounted for movement out of cooperating relation with the peripheral wall section 90 to provide for complete access to the interior of the magazine structure 32. As shown, the wall section 92 and closure section 94 are interconnected with the wall section 90, as by an inclined hinge assembly 96 for pivotal movement from an operative position in cooperating relation with the peripheral wall section 90 in a direction both radially and axially away from the latter into an open access position, as shown in FIGURE 6.

The guide structure 34 is provided in part by a rigid body member 98 which is fixedly secured to the adjacent end of the body section 12, as by bolts 100 or the like. As best shown in FIGURE 11, the member 98 includes an elongated surface 102 of arcuate cross-sectional configuration disposed in alignment with the driver rod 18 and defining a part of the delivery passage 38. Communicating laterally with the elongated surface 102 is an elongated surface 104 of arcuate configuration in cross section and defining a semi-cylindrical chamber portion within which the feed mechanism 36 is mounted. The portion of the member 98 extending laterally outwardly of the surface 104 is formed with a nail head receiving groove 106 which communicates at one end with the surface 104 at a position spaced from the adjacent end thereof and at its opposite end is flared outwardly.

A recess 108 is formed in the adjacent portion of the member 98 which receives one end of a generally L-shaped mounting bracket assembly 110. The mounting bracket 110 is rigidly secured to the body member 98 by any suitable means, such as bolt assemblies 112, and the opposite end thereof is fixedly secured to the adjacent portion of the base member 44 and peripheral wall section 90 of the magazine structure 32, as by welding or the like. As best shown in FIGURE 4, mounting bracket 110 may include an interior nail head guiding portion 114 which is fixed within the adjacent interior of the peripheral wall section 90 and extends outwardly thereof in arcuate configuration in a position adjacent the groove 106 so as to engage beneath the heads of the nails disposed within the magazine.

Another part of the guide structure 34, which cooperates with the guide groove 106, is carried by the adjacent end of the pivoted peripheral wall section 92 of the magazine structure. As best shown in FIGURES 1, 6 and 11, the peripheral magazine wall section 92 is provided at the end thereof opposite from the hinge 92 with an integral outwardly extending guide wall portion 116. Preferably, the interior surface of the guide wall portion is formed with a guide ledge 117 positioned to engage beneath the nail heads as they pass from the magazine. For the purpose of stabilizing the guide wall portion 116 when in operative position, a U-shaped guide bar 118 is fixedly secured to the exterior surface thereof, as by welding or the like, in a position such that one leg thereof engages over the adjacent portion of the body member 98, the other leg thereof engaging beneath an adjacent portion of a rigid nose piece 120 fixedly secured to the free end of the body member 98. It can be seen that since the guide wall portion 116 is fixed to the pivoted magazine wall section, it is readily movable out of its normal operating position in cooperating relation to the fasteners disposed within the guide structure into an open access position so as to provide convenient and complete access to the cooperating portion of the guide structure.

The remaining part of the guide structure 34 is provided by a guide member 122 pivotally mounted on the body member 98, as indicated at 124 (see FIGURES 2 and 4) about an axis parallel with the axis of the fastener delivery passage 38 for movement between an operative position and an open access position. As best shown in FIGURE 11, the pivoted guide member 122 includes a laterally extending guide groove 126 positioned to engage beneath the heads 28 of the fasteners within the guide structure. One end of the guide groove 126 is flared outwardly while the opposite end thereof communicates with an end of an elongated surface 128 which is arcuate in cross-sectional configuration. When the pivoted guide member 122 is disposed in its operative position, the surface 128 forms a continuation of the surface 102 and hence defines a portion of the fastener delivery passage 38. A recess 130 is formed in the adjacent portion of the pivoted guide member for receiving and engaging the guide wall portion 116 so as to retain the latter in operative position when the pivoted guide member is disposed in operative position.

As best shown in FIGURE 10, suitable locking means is provided for retaining the pivoted guide member 122 and hence the pivotally mounted guide wall portion 116 in operative position. As shown, the locking means preferably is in the form of a block portion 132 formed integrally on the exteriorly laterally outward portion of the pivoted member, the block portion 132 being provided with a central bore 134 which communicates with the outer exterior surface of the block by an elongated groove portion. Slidably mounted within each end of the bore 132 is a locking member 136 having a finger engaging tab 138 extending radially outwardly from the associated bore 134 at one end thereof and a locking pin 140 extending axially outwardly of the opposite end thereof. A recess 142 is formed in the intermediate portion of each locking member 136 to receive therein a stop pin 144 extending through the adjacent structure of the block portion 132.

The locking pins 140 of each locking member 136 are resiliently urged into extended locking positions by a compression spring 146 disposed within the central portion of the bore 134 between the members 136 disposed therein. The locking pins 140 are adapted to engage within registering openings 148 and 150 formed in the adjacent portions of the body member 98 and nose piece 120, respectively, to secure the pivoted guide member 122 in operative position. As is clearly illustrated in FIGURE 11, the pivoted guide member 122 may be moved outwardly from its operative position by pinching the finger tabs 138 together so as to provide for complete access to the portion of the guide structure enclosed thereby as well as the feed means 36 and fastener delivery passage 38.

The feed means 36 comprises a turret member 152 which is mounted for step-by-step intermittent rotary motion within the chamber defined by the arcuate surface 104. The particular manner in which this movement is effected forms no part of the present invention and reference may be had to the aforesaid Maynard application for an understanding of the detailed construction and operation of the same. For present purposes, it is sufficient to state that the indexing movement is accomplished in response to the depression of the actuating shoe 42 when it is moved into engagement with a work piece preparatory to the initiation of the driving movement of the driver rod 18.

The periphery of the turret member 152 is formed with a plurality of circumferentially spaced fastener receiving pockets 154, each pocket being defined by an elongated surface of arcuate configuration in cross section, the curvature of the arc being of a size to receive a nail head 28 therein. As best shown in FIGURES 11–13, the flutes of the turret member 152 which define the pockets 154 are formed with a pair of longitudinally spaced notches 156. Each notch 156 is defined by an inclined upper guide surface and a lower transversely extending surface providing a cutting edge 158. As best shown in FIGURE 12, the notches are positioned within the turret member to receive the wires 30 of the fastener package.

As best shown in FIGURES 11–13, the rigid nose piece 120 includes a generally cylindrically shaped work engaging nose portion 160 having a fastener receiving bore 162 formed therein in alignment with the elongated surfaces 102 and 128 to define an extension of the delivery passage 38. The actuator shoe 42 is mounted on the nose piece 120 for pivotal movement about an axis transverse to the axis of the bore 162, as by pivot pin 164, the shoe 42 including a work engaging portion 166 generally surrounding the work engaging portion 160 of the nose piece.

It is important to note that the axis of the generally cylindrical magazine structure 32 is parallel with the longitudinal extent of the fastener delivery passage 38 and is disposed within a plane passing through and bisecting the handle 14 and housing section 12. This relationship provides a desirable balance to the apparatus which enables the operator to effect movement of the nose piece 120 and shoe 42 into engagement with the work with ease and facility. It will also be noted that the base member 44 of the magazine structure 32 is positioned generally in the plane of the work engaging surfaces of the nose piece and shoe (when depressed) materially aiding in the support of the apparatus on the work surface. This relationship is particularly advantageous when the apparatus is used on upwardly facing work surfaces such as floors and roofs. The greater work engaging surface provided by the magazine structure, however, is spaced from the nose piece so that toe nailing and other such operations where extensive flat work surfaces are not presented can be conveniently accomplished.

*Operation*

Before commencing operation, it is first necessary to mount a fastener package 20 in operative position within the fastener handling section 16. To accomplish this, it is necessary initially to gain access both to the magazine structure as well as the guide structure and feed mechanism. The operator gains such access simply by gripping the locking tabs 138 and pivoting the guide section 122 outwardly, as shown in FIGURE 11. This pivotal movement releases the pivoted magazine section so that it, too, may be moved outwardly into its access position, as shown in FIGURE 7.

Next, the operator adjusts the support assembly 60 of the magazine 32 to accommodate the particular size of the fastener package which is to be mounted therein. The manner in which this adjustment is accomplished has been described above in connection with the description of FIGURES 7–9. Since the operator has complete access both axially and transversely to the supporting assembly 60 of the magazine structure, it is a simple matter for the operator to drop the fastener package over the outer spindle 66 and to manually position the leading portion of the outer coil layer of the fastener package so that the heads of the nails therein are engaged within the guide groove 106 and the two leading nails are disposed within the adjacent pockets of the feed turret member 152.

After this simple loading procedure has been performed, the movable section of the magazine is simply pivoted into an operative position and then the movable guide member 122 is pivoted into operative position while gripping the locking tabs 138. Upon release of the locking tabs the pivoted sections are firmly retained in operative position.

The manner in which the fastener package 20 is retained within the magazine structure 32 is an important feature of the present invention. As shown in FIGURE 5, it will be noted that the frusto-conical outer peripheral wall portion 62 serves to receive and support the points 26 of the nails 22 disposed in the outer layers of the package 20. The inner layers of the package disposed adjacent the flat supporting portion 64 are supported by the interengagement of their heads with one another. As shown in FIGURE 5, the configuration of the magazine structure 32 is such that it closely confines a full fastener package when mounted therein. Thus, when the greatest nail load is contained within the magazine, the structure is capable of retaining the package in its desired conical coiled formation. It will be understood that in the normal operation of the apparatus, the fastener packaging will be subjected to severe percussive forces which might tend to disrupt the coil formation in such a way as to prevent proper discharge of the fastener package from the magazine. The discharge is facilitated as well by the frusto-conical configuration of the peripheral wall portion 62, since this surface tends to cause the outer layer of the fastener package to move toward the peripheral wall, thus facilitating the maintenance of longitudinal alignment of the fasteners in the outer layer both within the magazine and within the guide structure 34. Moreover, by supporting the entire fastener package on the frusto-conical surface through the points 26 of the fasteners in the outer layers, the frictional resistance to the necessary rotative movement of the package about the outer spindle 66 is greatly reduced, thus facilitating the feeding action. As the fastener package is fed from the magazine structure by movement of the outer layer therefrom, the tighter wound inner layers of the package adjacent the flat supporting wall portion 64, rather than tending to move downwardly along the frusto-conical surface 62, will tend to move downward onto the flat surface of the portion 64 so as to maintain a desirable longitudinal alignment in the fasteners in the outer layer both within the magazine and the guide structure.

It will be understood that the fasteners within the guide structure are supported thereby in such a way as to permit movement only in a direction from the magazine to the feed turret member 152. The fasteners are contacted on both sides in a direction transverse to this movement and longitudinal movement is prevented by virtue of the engagement of the heads within the grooves 106 and 126. It is of significance to note that the leading fasteners engaged within the pockets 154 of the feed turret member 152 are retained against movement by engagement of the head with the pocket engaging surface which extends above the head and the engagement of the head within the groove 126. Thus, when the intermittent movement turret member serves to engage the leading fastener within the delivery passage 38, the head of the fastener is disposed in alignment with the driver pin 18 so that the fastener in its driving movement need not have any component of lateral movement. During the entire driving movement of the fastener within the passage 38, it is carried by arcuate surfaces which are in generally close confinement with the periphery of the head so that there is little chance of a binding action.

As best shown in FIGURES 12 and 13, it will also be noted that when a fastener is disposed within the delivery passage 38, the wires 30 which interconnect the fastener to the next adjacent fastener will be disposed in the notches 156. The cutting edges 158 are thus disposed in a position extending transversely across the wires so as to be contacted thereby as the wires are moved with the fastener during the initial portion of their driving movement. As shown in FIGURE 13, this contact of the wires with the cutting edges 158 serves to sever the same and insure that the wires extending between adjacent fasteners will be severed intermediate their welded connections with the fasteners. This cutting action of the wires intermediate their welded connections insures that wire portions will be retained with each fastener to give the barbed holding effect and further insures that the wires will not be simply pulled from the next succeeding fastener during the driving movement of the leading fastener. It is important that the wires be properly severed intermediate each pair of fasteners, first, because excessively long wire portions adhering to a fastener may tend to jam the fastener in its movement, and second, the support of the leading fastener within the delivery passage 38 is dependent upon the connection of wires therewith prior to the operative driving stroke of the driver rod 18.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. Apparatus for driving fasteners comprising
   a body structure defining a fastener delivery passage arranged to receive a fastener for transverse inward movement therein and for longitudinal outward movement therefrom,
   a cylindrical magazine structure fixedly carried by said body structure with the axis thereof parallel with the longitudinal extent of said fastener delivery passage adapted to receive a fastener package including a multiplicity of parallel headed fasteners interconnected in series, driving means carried by said body structure for movement between a fastener receiving position and a fastener driven position so that the leading fastener of said package can be moved transversely into said delivery passage when said driving means is in said fastener receiving position for movement longitudinally out of said delivery passage by said driving means during the movement of the latter from said fastener receiving position to said fastener driven position, and guide and feed means between said magazine structure and said fastener delivery passage for guiding the leading portion of the fastener package extending from said magazine to said fastener delivery passage and operable upon such leading portion after each leading fastener has been driven from said delivery passage by said driving means to move the next successive leading fastener transversely into said delivery passage, said body structure including a movable portion having surface means defining a transverse part of said fastener delivery passage, means mounting said movable body portion for movement with respect to the remainder of said body structure between an operative position wherein said surface means is disposed in delivery passage defining relation and an open access position wherein said surface means is disposed out of said relation permitting transverse access to said delivery passage, said cylindrical magazine structure including a movable segmental peripheral wall portion having closure means fixed thereto, means mounting said movable magazine structure wall portion for movement with respect to the remaining magazine structure between an operative position wherein said movable magazine wall portion and closure means are disposed in fastener package holding relation and an open access position wherein said movable magazine wall portion is disposed out of said relation permitting transverse and longitudinal access to said magazine structure, said guide and feed means being operable to prevent movement of the leading portion of the fastener package guided and fed thereby in a direction transverse to the direction of guiding and feeding movement thereof when both said movable portions are disposed in said operative position but permitting transverse access movement of said leading portion of said fastener package when both said movable portions are disposed in said open access position.

2. Apparatus as defined in claim 1 wherein said movable magazine wall portion includes an outer extremity and said movable body portion includes an outer extremity overlapping the outer extremity of said movable magazine wall portion when both said movable portions are disposed in said operative position, and locking means on the outer extremity of said movable body portion selectively engageable with said body structure for releasably locking both said movable portions in said operative position.

3. Apparatus as defined in claim 2 wherein said mounting means for said movable magazine wall portion comprises hinge means connected with one edge portion of said movable magazine wall portion and with the remaining magazine structure with its axis inclined with respect to the axis of said cylindrical magazine structure so that said movable magazine wall portion and said closure means are mounted for pivotal movement out of said operative position with both a transverse and longitudinal component of movement.

4. Apparatus as defined in claim 1 wherein said guide and feed means includes a turret feed member having a central axis of rotation disposed parallel with the longitudinal extent of said fastener delivery passage and a plurality of circumferentially spaced, longitudinally extending fastener receiving pockets of a size throughout the longitudinal extent thereof to receive a portion of the periphery of a fastener head therein, said turret member being mounted on said body structure for successive incremental movements about the axis of rotation thereof to bring successive peripheral pockets thereof into an operative position in cooperating communicating relation to said fastener delivery passage so that a leading fastener received within the pocket in operative position is disposed in alignment within said delivery passage for longitudinal outward movement therefrom by said driving means.

5. Apparatus as defined in claim 4 wherein said guide and feed means comprises a fastener head receiving groove formed in said movable body portion in communicating relation with the delivery passage defining surface means thereof and extending arcuately therefrom in communicating relation to a portion of the periphery of said turret feed member when said movable body portion is disposed in said operative position and, a fastener head receiving groove formed in said body structure between said turret feed member and said magazine structure.

6. Apparatus as defined in claim 5 wherein said magazine structure includes a circular fastener support member having a frustoconical outer peripheral portion adapted to receive in supporting relation the fastener package disposed within said magazine structure, and means to adjust the position of said fastener support member along an axis parallel to the longitudinal extent of said fastener delivery passage to accommodate fastener packages of different fastener length size so that the fastener heads will be properly positioned to enter said fastener receiving grooves.

7. In a power actuated nail driving apparatus, a cylindrical magazine for receiving a conical cylindrical package of nails secured together in series, each said nail having a head at one end and a pointed work piece entering surface at the other end, a circular fastener support member disposed in said magazine having a frustoconical outer peripheral portion adapted to receive in supporting relation the conical cylindrical package of nails by engagement of the work piece entering surfaces of the adjacent nails positioned in said magazine, and means to adjust the position of said fastener support member along the axis of said cylindrical magazine.

8. Apparatus as defined in claim 7 wherein said circular fastener support member includes a radially extending flat inner portion joined with said frustoconical outer peripheral portion, the adjacent nails positioned in said magazine being supported by their heads in a position thereabove.

9. Apparatus as defined in claim 8 wherein said radially extending inner portion has a cylindrical spindle connected therewith and extending axially therefrom to engage within the center of the conical cylindrical package of nails.

10. Apparatus as defined in claim 9 wherein said cylindrical magazine includes a fixed base structure disposed below said circular fastener support member, peripheral wall means carried by said base structure and closure means extending within said peripheral wall means in spaced relation to said circular support member, said adjusting means being operably connected between said circular support member and said base structure.

11. Apparatus as defined in claim 10 wherein said base structure includes a fixed inner spindle rotatably receiving said first mentioned spindle and
wherein said adjusting means comprises,
   spring means acting between said spindles resiliently urging said support member toward said base structure and
   a plurality of circumferentially spaced adjustment tabs carried by said support member and engageable with said base structure to dispose said support member in different positions of spaced relation from said base structure corresponding to different positions of rotational movement of said support member about the common axis of said spindles.

References Cited
UNITED STATES PATENTS

| | | | |
|---|---|---|---|
| 418,360 | 12/1889 | Van Houten | 227—137 XR |
| 2,982,595 | 5/1961 | Rogers | 227—136 |

GRANVILLE Y. CUSTER, Jr., *Primary Examiner.*